(12) United States Patent
Fischlein et al.

(10) Patent No.: US 12,491,134 B2
(45) Date of Patent: Dec. 9, 2025

(54) MEDICAL DELIVERY DEVICE

(71) Applicant: HOFFMANN-LA ROCHE INC., Little Falls, NJ (US)

(72) Inventors: Christian Fischlein, Struer (DK); Allan Lester Kierkegaard, Struer (DK)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 713 days.

(21) Appl. No.: 17/795,786

(22) PCT Filed: Jan. 28, 2021

(86) PCT No.: PCT/EP2021/052011
§ 371 (c)(1),
(2) Date: Jul. 27, 2022

(87) PCT Pub. No.: WO2021/152027
PCT Pub. Date: Aug. 5, 2021

(65) Prior Publication Data
US 2023/0086293 A1 Mar. 23, 2023

(30) Foreign Application Priority Data
Jan. 28, 2020 (EP) .................................... 20154087

(51) Int. Cl.
*A61J 1/22* (2006.01)
*A61M 5/20* (2006.01)
(Continued)

(52) U.S. Cl.
CPC ................ *A61J 1/22* (2013.01); *A61M 5/204* (2013.01); *A61M 5/31553* (2013.01); *A61M 5/31556* (2013.01); *A61M 5/3213* (2013.01)

(58) Field of Classification Search
CPC ...... A61J 1/22; A61M 5/204; A61M 5/31553; A61M 5/31556; A61M 5/3213
See application file for complete search history.

(56) References Cited

U.S. PATENT DOCUMENTS

| 10,918,795 | B2* | 2/2021 | Gaillot | ................ | A61J 1/2096 |
| 11,565,052 | B2* | 1/2023 | Collings | ........... | A61M 5/31526 |
| 2018/0361072 | A1* | 12/2018 | Streit | .................. | A61M 5/3158 |

FOREIGN PATENT DOCUMENTS

| WO | 2017102742 A1 | 6/2017 |
| WO | 2017102745 A1 | 6/2017 |

(Continued)

OTHER PUBLICATIONS

International Search Report and Written Opinion issued Apr. 14, 2021 in Intl. Appl. No. PCT/EP2021/052011.
(Continued)

*Primary Examiner* — Dung T Ulsh
(74) *Attorney, Agent, or Firm* — MEDLER FERRO WOODHOUSE & MILLS PLLC

(57) ABSTRACT

A medical delivery device is disclosed having a rod element having a first thread arrangement, a dosage member having a second thread arrangement, a dial unit, and a coupling structure coupling the dial unit to the dosage member. A stem of the rod element extends into a chamber body of the dosage member. In a dosing status, the rod element is movable relative to the dosage member by the first and second thread arrangements travelling along each other such that a volume of a dosage chamber of the chamber body is varied. In the dosing status rotation of the dial unit applies a torsional force to the dosage member, wherein the torsional force rotates the dosage member such that the first and second thread arrangements travel along each other. An overload protection mechanism is provided that is configured to prevent the torsional force from exceeding a predefined threshold force.

20 Claims, 3 Drawing Sheets

(51) Int. Cl.
*A61M 5/315* (2006.01)
*A61M 5/32* (2006.01)

(56) References Cited

FOREIGN PATENT DOCUMENTS

| | | |
|---|---|---|
| WO | 2017102760 A1 | 6/2017 |
| WO | 2019086589 A1 | 5/2019 |
| WO | 2019102027 A1 | 5/2019 |
| WO | 2019219824 A1 | 11/2019 |
| WO | 2021099432 A1 | 5/2021 |
| WO | 2022090274 A1 | 5/2022 |

OTHER PUBLICATIONS

Communication pursuant to Article 94(3) EPC issued Oct. 29, 2025 in EP Appl. No. 21 702 477.7.

* cited by examiner

MEDICAL DELIVERY DEVICE

TECHNICAL FIELD

The present invention relates to a medical delivery device according to the preamble of independent claim 1. The patent applications WO 2017/102760 A1 or in WO 2019/086589 A1 or in WO 2017/102742 A1 are incorporated herein by reference in their entireties, except for any definitions, subject matter disclaimers or disavowals, and except to the extent that the incorporated material is inconsistent with the express disclosure herein, in which case the language in this disclosure controls.

Container adapters of that kind typically comprise a rod element having a stem with a longitudinal axis and a first thread arrangement, a dosage member having a second thread arrangement and a chamber body, a dial unit, and a coupling structure coupling the dial unit to the dosage member. The stem of the rod element usually extends into the interior of the chamber body of the dosage member, and, in a dosing status of the medical delivery device, the first thread arrangement of the rod element engages the second thread arrangement of the dosage member, the rod element is movable along its longitudinal axis relative to the dosage member by the first thread arrangement of the rod element and the second thread arrangement of the dosage member travelling along each other such that a volume of a dosage chamber in the interior of the chamber body of the dosage member is varied. Thereby, rotation of the dial unit applies a torsional force to the dosage member via the coupling structure, which torsional force rotates the dosage member such that the second thread arrangement of the dosage member and the first thread arrangement of the stem of the rod element travel along each other. They can be used for delivering a liquid stored in a container, such as a medicament or drug substance stored in a vial, in a definable dosage. For example, such delivery can be injection.

BACKGROUND ART

Delivering a liquid or other fluid out of a container is required in many medical applications and performed in a plurality of different ways. Particularly, where it is essential that the liquid is comparably precisely provided, specific devices are commonly used. For example, liquid pharmaceutical or drug substances are often provided in glass or plastic vials which are closed by a septum or rubber plug and a cap clamped around it, or another similar seal cover.

Conventionally, for delivering the pharmaceutical substance out of vials, syringes are used. Thereby, a transfer needle attached to a syringe penetrates the septum or cover and the pharmaceutical substance is withdrawn into the syringe through the transfer needle. Once transferred into the syringe, the pharmaceutical substance is delivered in an appropriate manner. For example, the substance can be, e.g. subcutaneously or intramuscularly, injected via an injection needle or it can be orally applied or provided as droplets, e.g., in the eyes or nose of the patient.

However, delivering liquids from vials or containers by means of syringes usually is comparably difficult. It typically makes it necessary that an educated person such as a doctor or a nurse is involved. In particular, in cases where the dosage of liquid delivered has to be comparably precise such as when comparable small volumes as in a range of ten microliter to about one milliliter are involved patients are typically not capable of performing the delivery themselves when using a syringe or a similar device.

For being able to accurately provide the pharmaceutical or drug substances in containers or vials there exist devices which allow a particularly convenient and user friendly dosing. For example, WO 2017/102760 A1 shows a medical delivery device having a vial seat for holding a vial in a predefined position, a dosage chamber and a dosing mechanism to transfer a liquid substance from the vial to the dosage chamber. The dosing mechanism comprises a rod element having a stem with a longitudinal axis and a first thread arrangement, a dosage member having a second thread arrangement and a chamber body, a dial unit, and a coupling structure coupling the dial unit to the dosage member. The first thread arrangement of the rod element engages the second thread arrangement of the dosage member. For dosing, the rod element is movable along its longitudinal axis relative to the dosage member by the first thread arrangement of the rod element and the second thread arrangement of the dosage member travelling along each other such that a volume of a dosage chamber in the interior of the chamber body of the dosage member is varied. More specifically, by rotating the dial unit, it applies a torsional force to the dosage member via the coupling structure, which torsional force rotates the dosage member such that the second thread arrangement of the dosage member and the first thread arrangement of the stem of the rod element travel along each other.

Since often medical delivery devices are operated by comparably unskilled persons, misuse or failure in operation has to be prevented as good as possible. For example, in the medical delivery device of WO 2017/102760 A1 a lock mechanism is provided which is adapted to prevent operation of the dosing mechanism when no vial is held in the vial seat and to allow operation of the dosing mechanism when the vial is held in the vial seat. In use, the vial containing the drug substance to be administered is positioned in the vial seat. Thereby, a cap of the vial is pierced such that an interior of the vial is accessed. Also, the lock mechanism is activated such that the medical delivery device is free for dosing. By turning the dial unit of the medical delivery device with respect to a body part of the medical delivery device, the drug substance is withdrawn from the vial into the dosage chamber in a controlled and well definable manner. When an appropriate amount is dosed, the dial unit together with the vial is retracted from the body part and the drug substance is delivered from the dosage chamber, e.g., by injection.

Even though such lock mechanism allows for lowering the chances of misusing the medical delivery device dosing operation may still be problematic. For example, when the maximum volume is dosed a further rotation of the dial unit may break the device. Thus, there is a need for a medical delivery device increasing safety during a dosing operation.

DISCLOSURE OF THE INVENTION

According to the invention this need is settled by a medical delivery device as it is defined by the features of independent claim 1. Preferred embodiments are subject of the dependent claims.

The medical delivery device can particularly be provided for administering a drug substance.

The term "drug" as used herein relates to a therapeutically active agent, also commonly called active pharmaceutical ingredient (API), as well as to a combination of plural such therapeutically active substances. The term also encompasses diagnostic or imaging agents, like for example contrast agents (e.g. MRI contrast agents), tracers (e.g. PET tracers) and hormones, that need to be administered in liquid form to the patient.

The term "drug substance", "pharmaceutical substance" or "pharmaceutical" as used herein relates to a drug as defined above formulated or reconstituted in a form that is suitable for administration to the patient. For example, besides the drug, a drug substance may additionally comprise an excipient and/or other auxiliary ingredients. A particularly preferred drug substance in the context of the invention is a drug solution, in particular a solution for oral administration, injection or infusion.

The term "drug product" as used herein or similar relates to a finished end product comprising a drug substance or a plurality of drug substances. In particular, a drug product may be a ready to use product having the drug substance in an appropriate dosage and/or in an appropriate form for administration. For example, a drug product may include an administration device such as a prefilled syringe or the like.

In particular, in one aspect the invention is a medical delivery device comprising a rod element, a dosage member, a dial unit and a coupling structure. The rod element has a stem with a longitudinal axis and a first thread arrangement. The dosage member comprises a second thread arrangement and a chamber body. The coupling structure couples the dial unit to the dosage member. The stem of the rod element extends into the interior of the chamber body, advantageously into a dosage chamber thereof, of the dosage member.

In a dosing status of the medical delivery device, the first thread arrangement of the rod element engages the second thread arrangement of the dosage member. Further, in the dosing status of the medical delivery device, the rod element is movable along its longitudinal axis relative to the dosage member by the first thread arrangement of the rod element and the second thread arrangement of the dosage member travelling along each other such that a volume of a dosage chamber in the interior of the chamber body of the dosage member is varied. Still further in the dosing status of the medical delivery device, rotation of the dial unit applies a torsional force to the dosage member via the coupling structure, which torsional force rotates the dosage member such that the second thread arrangement of the dosage member and the first thread arrangement of the stem of the rod element travel along each other.

The coupling structure has an overload protection mechanism configured to prevent that the torsional force applied by the dial unit to the dosage member exceeds a predefined threshold force. The coupling structure can be or comprise a specific part or element. It can also be embodied in other parts of the medical delivery device such as in the dial unit, the dosage member or the like. Or, it can be embodied by a combination of a specific part and features of the other parts.

The stem of the rod element of the medical delivery device can have the shape of a post or cylinder. While extending into the chamber body of the dosage member or an interior thereof a distal end of the body of the rod element can be located close to a distal end of the chamber body and a proximal end of the stem of the rod element can be located close to a proximal end of the chamber body.

The dosage member can be embodied with a delivery orifice which can be shaped for a particular application or administration of a medicament or drug to be delivered by the device. For example, it can be equipped with a needle or a needle adapter if the medical delivery device is intended for injecting a drug substance. In such an embodiment the needle can extend from the interior of the dosage member out of the dosage member. Or, the delivery orifice can be a spout, e.g., being shaped to deliver droplets into an eye, or a nozzle or the like. The delivery orifice can also be adapted for being connected to a delivery member. For example, it can comprise a male or female part of a Luer lock or Luer taper connector and the delivery member can be equipped with a corresponding female or male Luer lock connector. The delivery orifice can be arranged at a proximal end of the dosage member.

The medical delivery device can be made of a plastic material. In particular, it can be made of a sterilisable plastic material which can be manufactured in an injection molding process.

The term "extend into" as used herein in connection with the rod element, the dosage member, the housing or another part can relate to being fully or partially arranged inside. It can, for example, relate to an arrangement where a portion or a part is partially outside another part but projects into the other part.

By having the coupling structure with its overload protection mechanism, the medical delivery device according to the invention can increase safety during dosing operation. In particular, it can be prevented that the medical delivery device is damaged by unintended rotational operation of the dial unit relative to the dosage member. Like this, the chances of misusing the medical delivery device may be lowered.

Preferably, the overload protection mechanism of the coupling structure comprises a protection element connecting the dial unit to the dosage member. Such protective element as specific part of the overload mechanism allows for efficiently implementing features required.

Thereby, the protection element of the overload protection mechanism of the coupling structure preferably comprises a ring portion surrounding the dosage member. Such ring portion allows for an efficient at least temporary coupling of the dial unit, the protective element and the dosage member. In particular, it allows for a comparably simple and effective torsional coupling.

Preferably, the protection element of the overload protection mechanism of the coupling structure either is torque-proofly connected to the dosage member and connected to the dial unit such that the protection element does not rotate together with the dial unit when the torsional force applied by the dial unit exceeds the predefined threshold force. Or, it is torque-proofly connected to the dial unit and connected to the dosage member such that the protection element does not rotate together with the dosage member when the torsional force applied by the dial unit exceeds the predefined threshold force. This allows for an efficient and effective construction of the coupling structure.

Preferably, the overload protection mechanism of the coupling structure has a first engaging structure and a second engaging structure, wherein the first engaging structure and the second engaging structure inter-engage and are configured to disengage when the torsional force applied by the dial unit exceeds the predefined threshold force. Such engaging structures allow for efficiently coupling and de-coupling depending on the torsional force applied.

Thereby, the first engaging structure preferably comprises an indentation and the second engaging structure comprises a projection, wherein the first engaging structure and the second engaging structure inter-engage by the projection being positioned in the indentation. More specifically, the projection preferably is mounted with a radially flexibility, the indentation preferably has a tangential boundary configured to radially press the projection when the projection travels along the tangential boundary, and the tangential boundary of the indentation and the radial flexibility of the projection preferably predefine the threshold force.

Preferably, the ring portion of the protection element of the overload protection mechanism of the coupling structure comprises the first engaging structure and the dial unit comprises the second engaging structure.

Thereby, the first engaging structure preferably is located at an outer circumference of the ring portion. Such positioning of the first engaging structure allows for providing good accessibility of the first engaging structure. Thereby, the outer circumference of the ring portion is equipped with plural identical first engaging structures. For example, the ring portion can be embodied with four first engaging structures or indentations.

Preferably, the dial unit has a sleeve portion surrounding the protection element of the overload protection mechanism of the coupling structure. Such sleeve portion allows for an efficient coupling and de-coupling of the dial unit the protective element, particular with regard to a torsional movement.

Preferably, the sleeve portion of the dial unit is arranged adjacent to the ring portion of the protection element and the second engaging structure is located at an inner circumference of the sleeve portion of the dial unit. Thereby, the sleeve portion of the dial unit has a flexible arm segment and the second engaging structure is located at the flexible arm segment. Such arm segment allows for efficiently providing a coupling and de-coupling depending on the torsional force applied.

Thereby, in the sleeve portion preferably an essentially U-shaped cut is provided which forms the arm segment. Such cut allows for efficiently providing the arm segment. Furthermore, it allows for accurately setting properties of the arm segment as desired. For example, the shape of the cut can be embodied to define an appropriate elasticity which enables a safe and convenient operation.

Preferably, the projection of the coupling structure is vertically oriented and bar-like shaped and arranged at the arm segment, in particular, near a top end of the arm segment. Preferably, the projection radially extends towards the axis of the medical delivery device.

Preferably, indentations are regularly distributed about a circumference of the ring portion, wherein, if the torsional force applied by the dial unit to the protective member exceeds a predefined threshold force, the projection travels along a tangential boundary of the indentations which causes the arm segment to outwardly bend such that the projection is movable out of the respective indentation. Such configuration allows for a particularly efficient interaction and operation can be achieved.

Preferably, the dial unit is equipped with a gripping structure forming an outer surface portion of the medical delivery device. Such outer surface portion can conveniently be accessed by a user of the medical delivery device to operate it. The gripping structure can particularly be manually accessible for a user of the medical delivery device such that a convenient dosing operation can be performed by the user. For example, the gripping structure can comprise ribs, allowing a comfortable manual operation.

Preferably, the rod element and the dosage member are configured to move relative to each other along the axis such that a distance between an end of the stem of the rod element and the orifice of the dosage member is varied. is movable along its longitudinal axis relative to the dosage member by the first thread arrangement of the rod element and the second thread arrangement of the dosage member travelling along each other such that a volume of a dosage chamber in the interior of the chamber body of the dosage member is varied.

Thereby, the rod element and the dosage member preferably are configured such that the volume of the dosage chamber in the interior of the chamber body of the dosage member is varied concomitantly with the distance between the end of the stem of the rod element and the orifice of the dosage member.

BRIEF DESCRIPTION OF THE DRAWINGS

The medical delivery device according to the invention is described in more detail herein below by way of an exemplary embodiment and with reference to the attached drawings, in which.

DESCRIPTION OF EMBODIEMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
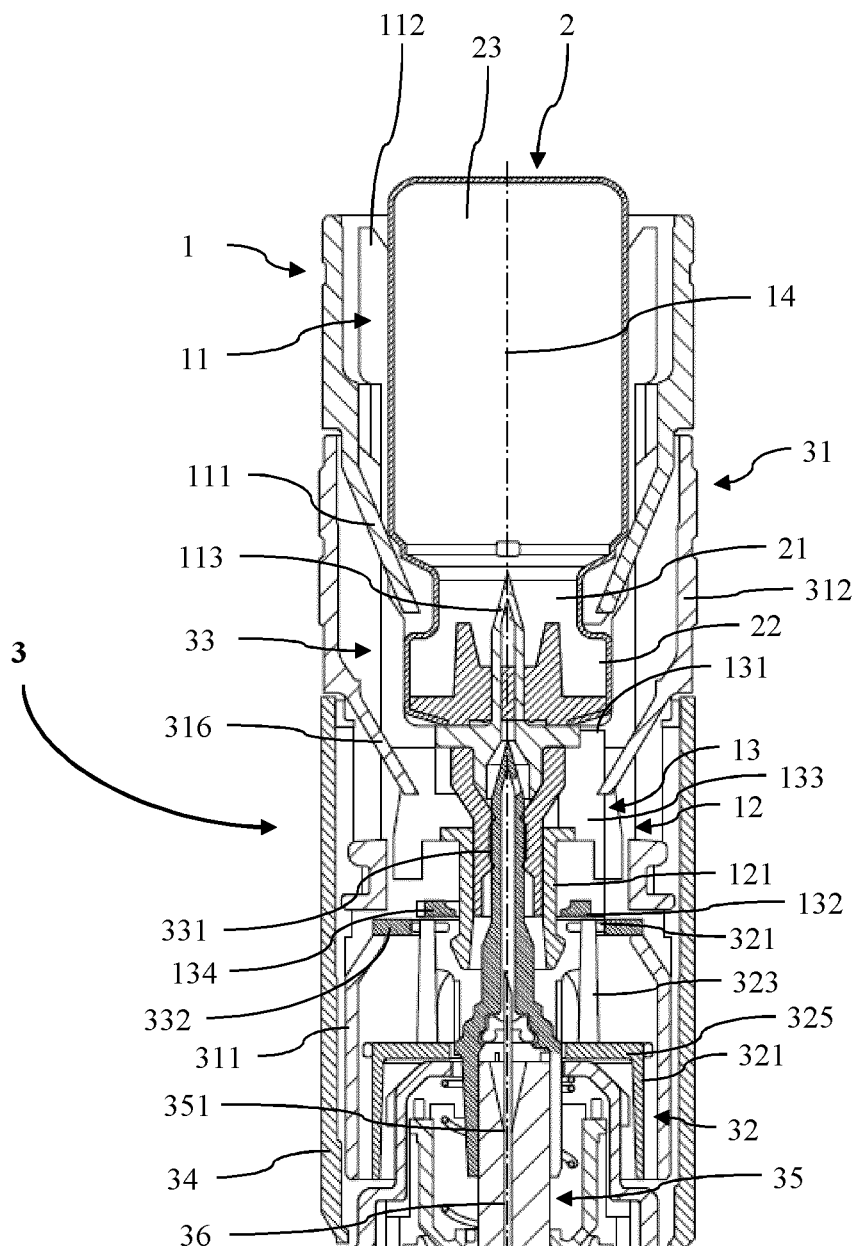
FIG. 1 shows a cross sectional side view of an embodiment of a medical delivery device according to the invention.

FIG. 1 shows a delivery assembly including an embodiment of a medical delivery device 3 according to the invention and a vial adapter 1. The vial adapter 1 defines a central adapter axis 14 and forms an upper adapter vial seat 11 and a lower joint structure 12. The adapter vial seat 11 has a ring shaped upper end portion which is equipped with plural vertical guide ribs 112 as alignment formation at its interior circumference. The lower end of the adapter vial seat 11 is formed by a base plate. Further, the adapter vial seat 11 is equipped with two lateral clip arms 111. The joint structure 12 comprises a spike recess 121 having a post portion with an essentially cylindrical circumference.

The vial adapter 1 further comprises an unlock mechanism with an activation member 13. The activation member 13 has a guiding portion in the form of a ring 134 arranged around the post portion of the spike recess 121 of the joint structure 12. Further, the activation member has a stem portion 133. The stem portion 133 vertically extends from the ring 134 in an upward direction. The top end side of the stem portion 133 of the activation member forms a container face 131 and the lower end side a lock mechanism face 132.

The medical delivery device 3 has a dial unit 31, a rod element, a dosage member 35 and a sleeve unit 34. The dial unit 31 has an essentially ring shaped gripping portion 312 as gripping structure which can be accessed from the outside of the medical delivery device 3 by a hand of an operator. The dial unit 31 further forms a vial seat 33, which is similarly set up as the adapter container seat 11 described above. In particular, the vial seat 33 has a bottom base plate 332 from which a spike 331 vertically extends in an upward direction along a central vertical longitudinal axis 36 of the medical delivery device 3. It is further equipped with plural clip arms 316 which are inclined towards the device axis 36. The vial adapter 1 is set in or mounted to the medical delivery device 3 by the joint structure 12 being positioned in the vial seat 33. Thereby, the joint structure 12 is configured such that the clip arms 316 of the vial seat 33 do not engage or otherwise interact with the vial adapter 1. Thus, the vial adapter 1 is not fixed to the medical delivery device 3 but can be detached, if desired.

The rod element has a stem with a longitudinal axis and a first thread arrangement. The dosage member 35 comprises a chamber body having a hollow interior, a second thread arrangement and an orifice adjacent to the hollow interior of the chamber body. The stem of the rod element extends into the interior of the chamber body of the dosage member 35. The first thread arrangement of the rod element engages the second thread arrangement of the dosage member 35. The medical delivery device further has a coupling structure coupling the dial unit 31 to the dosage member 35.

The medical delivery device 3 further has a lock mechanism to switch from a non-dosing status, in which dosing is blocked, to a dosing status, in which the device can dose. In FIG. 1 the medical delivery device 3 is depicted in a situation where the activation member 13 of the vial adapter has activated the lock mechanism of the medical delivery device 3 such that it is in the dosing status.

FIG. 1 shows a detailed view of components specific for the present invention. Other components such as the rod element, the first thread arrangement, the second thread arrangement, the coupling structure, and the lock mechanism are not explicitly shown but embodied as described in the prior art such as particularly in WO 2017/102760 A1 showing the entire medical delivery device. For example, in WO 2017/102760 A1 the rod element is referred to as 30, the first thread arrangement is referred to as 3320, 3330, the second thread arrangement is referred to as 650, and the lock mechanism is referred as to 530, 2410. The medical delivery device of the present disclosure is fully compatible with the devices and structures described in WO 2017/102760 A1. Furthermore, WO 2019/086589 A1 or WO 2017/102742 A1 show similar compatible structures.

A vial 2 is introduced top down into the adapter vial seat 11. The vial 2 is a conventional glass vial having a body 23 passing over into a head 22 via a neck 21. The head 22 has an opening closed by a cover with a septum. In the situation depicted in FIG. 1, the vial 2 is fully positioned in the adapter vial seat 11, i.e. properly held in the adapter vial seat 11. There, the clip arms 111 of the adapter vial seat 13 are clipped behind the head 21 of the vial 2 such that it irremovably is mounted to the vial adapter 1. The adapter spike 113 pierces the septum of the head 21 of the vial 2 such that an interior of the vial 2 is accessed by the adapter spike 113.

The spike 331 of the medical delivery device 3 extends into the hollow interior of the spike recess 121 of the vial adapter 1. The orifice of the dosage member 35 is equipped with a needle 351 which is positioned at a bottom end of the spike 331. Thereby, a continuous duct is formed from the needle 351 through the spike 331 and the adapter spike 113 opening at the adapter spike 113 towards the interior of the vial 2.

In the dosing status shown in FIG. 1, the rod element is movable along its longitudinal axis relative to the dosage member 35 by the first thread arrangement of the rod element and the second thread arrangement of the dosage member travelling along each other such that a volume of a dosage chamber in the interior of the chamber body of the dosage member 35 is varied. More specifically, rotation of the dial unit 31 applies a torsional force to the dosage member 35 via the coupling structure, which torsional force rotates the dosage member 35 such that the second thread arrangement of the dosage member 35 and the first thread arrangement of the rod element travel along each other. Thereby, the rod element and the dosage member 35 move relative to each other along the axis 36 such that a distance between the top end of the stem of the rod element and the orifice of the dosage member 35 is varied. Like this, the volume of the dosage chamber between the top end of the stem of the rod element and the orifice of the dosage member 35 is varied concomitantly.

In particular, by increasing the volume of the dosage chamber of the dosage member, a medium such as a liquid drug substance is withdrawn from the interior of the vial 2 into the dosage chamber via the duct formed by the needle 351, the spike 331 and the adapter spike 113. In contrast, by reducing the volume of the dosage chamber of the dosage member, the medium is forwarded from the dosage chamber to the interior of the vial 2.

Figure 2:
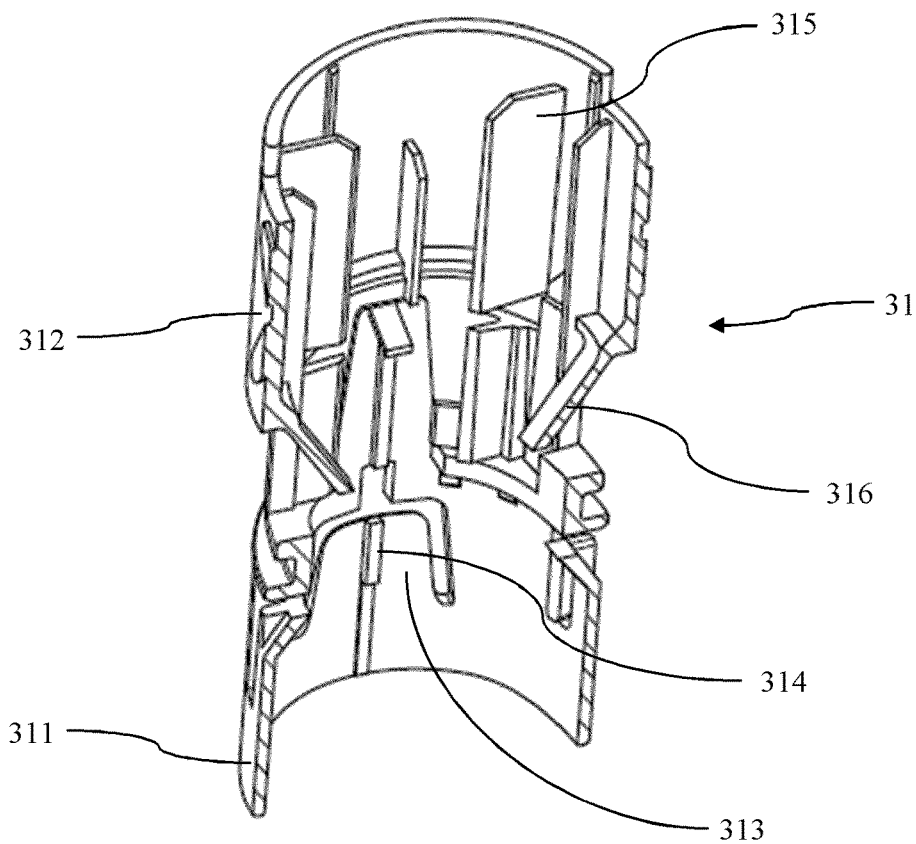
FIG. 2 shows a perspective cross sectional view of a dial unit of the medical delivery device of FIG. 1.

In the following FIGS. 2 to 4 the set up and interaction of the coupling structure is described in more detail. FIG. 2 shows the dial unit 31 cut apart along a device axis 36. Thereby, it can be seen that the gripping portion 312 is provided with longitudinal guide ribs 315 and that the dial unit 31 has a lower sleeve portion 311. In the sleeve portion 311 an essentially U-shaped cut is provided which forms a lamella-like arm segment 313. Near a top end of the arm segment 313 a vertically oriented, bar-like shaped projection 314 of the coupling structure is arranged at the arm segment 313. The projection 314 radially extends towards the device axis 36 of the medical delivery device 31. By being located at the arm segment 313 the projection 314 can be radially flexed away and towards the device axis 36 to a certain extent.

Figure 3:
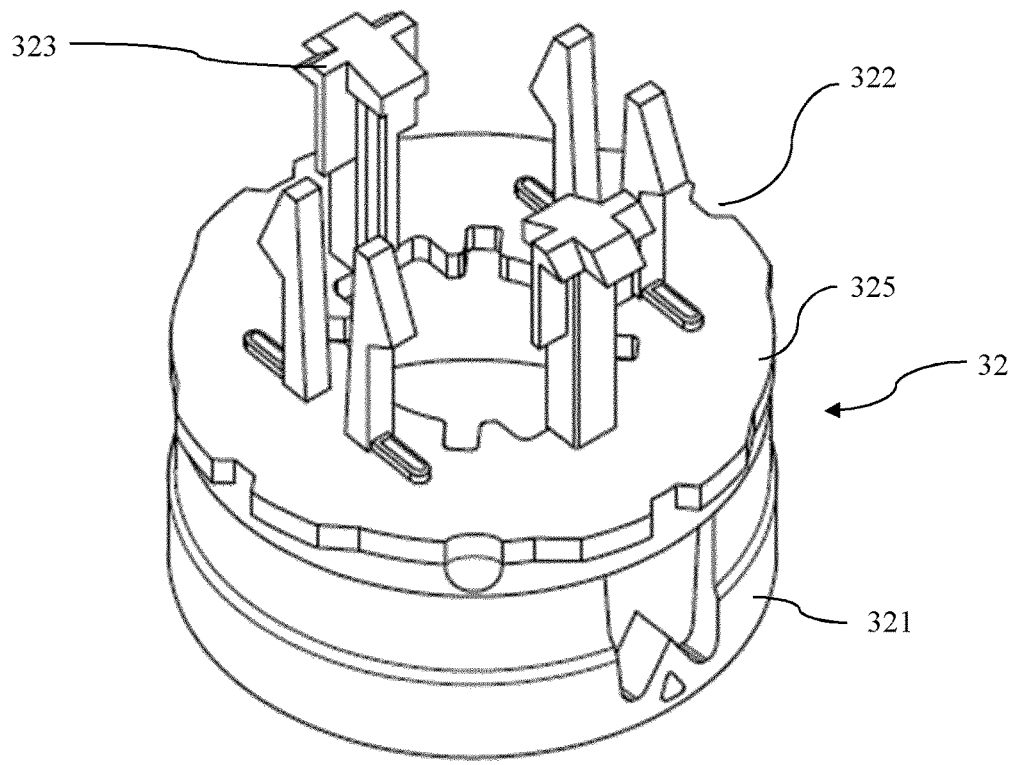
FIG. 3 shows a perspective view of a protective element of the medical delivery device of FIG. 1.

In FIG. 3 a protective element 32 of the coupling structure is shown. The protective element 32 comprises a cup-like shaped lower section which has a ring portion 321 and a cover portion 325. From the cover portion 325 stem portions 323 vertically extend. As can be seen in FIG. 1, the ring portion 321 is open at its bottom and the dosage member 35 is partially introduced into the ring portion 321. Thereby, the ring portion 321 surrounds the dosage member 34 in a radial direction and the protective element 32 is connected to the dosage member 34 in a torque-proof manner. Further, the protective element 32 is positioned in the sleeve portion 311 of the dial unit 31.

Turning back to FIG. 3, the ring portion 321 is equipped with four indentations 322. The indentations 322 are regularly distributed about a circumference of the ring portion 322 such that—starting at the height of the cover 325—the circumference is provided with the indentations at each 90°.

Figure 4:
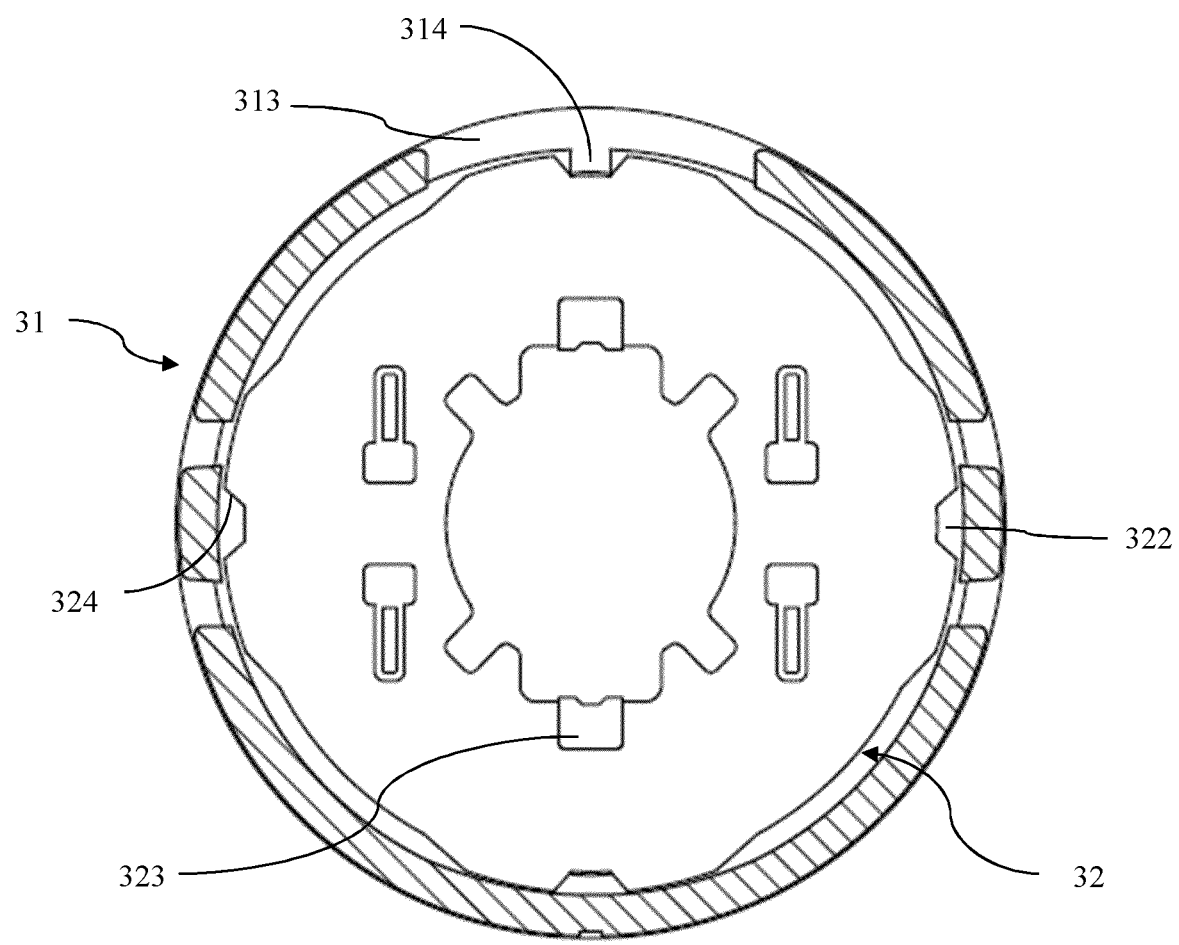
FIG. 4 shows a cross sectional top view of the dial unit of FIG. 2 and the protective element of FIG. 3.

FIG. 4 shows the protective element 32 and the dial shell 31 in an assembled state where the sleeve portion 311 of the dial shell 31 surrounds the cover portion 325 and the ring portion 321 of the protective element 32. The projection 314 of the dial shell 31 is positioned in one of the four indentations 322 of the protective element 32.

By the projection 314 being arranged in the indentation 322, a rotation of the dial unit 31 about the axis 36 induces the projection 314 to abut a tangential boundary 324 of the respective indentation 322 and the protective element as well as the dosage member rotate together with the dial unit 31. The tangential boundaries 324 of the indentations are slanted in relation to a radial direction of the protective element 32 or the dial unit 31. If the torsional force applied by the dial unit 31 to the protective member 32 exceeds a predefined threshold force, the projection 314 travels along the tangential boundary 324 which causes the arm segment 313 to outwardly bend such that the projection is moved out of the respective indentation 322. The dial unit 31 now rotates independent from the protective element 32 and the dosage member 34. In this state the dial unit 31 is decoupled from the protective element 32 until the projection 314 snaps in the next indentation 322 in a direction of rotation. For allowing a smooth snapping in, any inclination of the outer surface of the ring portion 321 is lower than an inclination of the tangential boundaries.

By the dial unit 31 being decoupled from the protective element 32, it is prevented that any rotational or torsional force exceeding the predefined threshold force is applied to the dosage member 34. Like this, the dosage member 34 and the complete dosing mechanism is protected. The predefined threshold force is given by the shape of the projection 314, the elasticity of the arm segment 313 as well as the inclination and shape of the tangential boundaries 324. Thus, the protective element 32 together with the arm segment 313 and the projection 314 establish an overload protection mechanism in the coupling structure preventing that the torsional force applied by the dial unit 31 to the dosage member 34 exceeds the predefined threshold force. For example, once the dosage member 34 is rotated up to its maximum or minimum rotational position, i.e. the dosage chamber being as closed or as open as possible, the overload protection mechanism prevents that the medical delivery device 3 is damaged by a forced further rotation of the dial unit 31.

This description and the accompanying drawings that illustrate aspects and embodiments of the present invention should not be taken as limiting-the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

| List of Reference Signs |
|---|
| 1 vial adapter |
| 11 adapter vial seat |
| 111 clip arms |
| 112 guide rib |
| 113 adapter spike |
| 12 joint structure |
| 121 spike recess |
| 13 activation member |
| 131 container face |
| 132 lock mechanism face |
| 133 stem portion |
| 134 ring |
| 14 adapter axis |
| 2 vial |
| 21 neck |
| 22 head |
| 23 body |
| 3 medical delivery device |
| 31 dial unit |
| 311 sleeve portion |
| 312 gripping portion |
| 313 arm segment |
| 314 projection |

-continued

| List of Reference Signs | |
|---|---|
| 315 | guide rib |
| 316 | clip arms |
| 32 | protective element |
| 321 | ring portion |
| 322 | indentation |
| 323 | stem portion |
| 324 | tangential boundary |
| 33 | vial seat |
| 331 | spike |
| 332 | base plate |
| 34 | sleeve unit |
| 35 | dosage member |
| 351 | needle |
| 36 | device axis |

The invention claimed is:

1. A medical delivery device, comprising:
a rod element having a stem with a longitudinal axis and a first thread arrangement;
a dosage member comprising a second thread arrangement and a chamber body;
a dial unit; and
a coupling structure coupling the dial unit to the dosage member,
wherein the stem of the rod element extends into the chamber body of the dosage member,
wherein, in a dosing status of the medical delivery device,
the first thread arrangement of the rod element engages the second thread arrangement of the dosage member,
the rod element is movable along its longitudinal axis relative to the dosage member by the first thread arrangement of the rod element and the second thread arrangement of the dosage member travelling along each other such that a volume of a dosage chamber in an interior of the chamber body of the dosage member is varied, and
rotation of the dial unit applies a torsional force to the dosage member via the coupling structure, which torsional force rotates the dosage member such that the second thread arrangement of the dosage member and the first thread arrangement of the stem of the rod element travel along each other, and
wherein the coupling structure has an overload protection mechanism configured to prevent that the torsional force applied by the dial unit to the dosage member exceeds a predefined threshold force.

2. The medical delivery device of claim 1, wherein the overload protection mechanism of the coupling structure comprises a protection element connecting the dial unit to the dosage member.

3. The medical delivery device of claim 2, wherein the protection element of the overload protection mechanism of the coupling structure comprises a ring portion surrounding the dosage member.

4. The medical delivery device of claim 2, wherein the protection element of the overload protection mechanism of the coupling structure either is
torque-proofly connected to the dosage member and connected to the dial unit such that the protection element does not rotate together with the dial unit when the torsional force applied by the dial unit exceeds the predefined threshold force, or
torque-proofly connected to the dial unit and connected to the dosage member such that the protection element does not rotate together with the dosage member when the torsional force applied by the dial unit exceeds the predefined threshold force.

5. The medical delivery device of claim 1, wherein the overload protection mechanism of the coupling structure has a first engaging structure and a second engaging structure, wherein the first engaging structure and the second engaging structure inter-engage and are configured to disengage when the torsional force applied by the dial unit exceeds the predefined threshold force.

6. The medical delivery device of claim 5, wherein the first engaging structure comprises an indentation and the second engaging structure comprises a projection, wherein the first engaging structure and the second engaging structure inter-engage by the projection being positioned in the indentation.

7. The medical delivery device of claim 6, wherein
the projection is mounted with a radially flexibility,
the indentation has a tangential boundary configured to radially press the projection when the projection travels along the tangential boundary, and
the tangential boundary of the indentation and the radial flexibility of the projection predefine the threshold force.

8. The medical delivery device of claim 3, wherein the ring portion of the protection element of the overload protection mechanism of the coupling structure comprises a first engaging structure and the dial unit comprises a second engaging structure.

9. The medical delivery device of claim 8, wherein the first engaging structure is located at an outer circumference of the ring portion.

10. The medical delivery device of claim 9, wherein the outer circumference of the ring portion is equipped with plural identical first engaging structures.

11. The medical delivery device of claim 2, wherein the dial unit has a sleeve portion surrounding the protection element of the overload protection mechanism of the coupling structure.

12. The medical delivery device of claim 8, wherein the dial unit has a sleeve portion surrounding the protection element of the overload protection mechanism of the coupling structure, wherein the sleeve portion of the dial unit is arranged adjacent to the ring portion of the protection element and wherein the second engaging structure is located at an inner circumference of the sleeve portion of the dial unit.

13. The medical delivery device of claim 12, wherein the sleeve portion of the dial unit has a flexible arm segment and the second engaging structure is located at the flexible arm segment.

14. The medical delivery device of claim 13, wherein in the sleeve portion an essentially U-shaped cut is provided which forms the arm segment.

15. The medical delivery device of claim 13, wherein a projection of the coupling structure is vertically oriented and bar-like shaped and arranged at the arm segment, and wherein the projection radially extends towards the axis of the medical delivery device.

16. The medical delivery device of claim 15, wherein indentations are regularly distributed about a circumference of the ring portion, and wherein, if the torsional force applied by the dial unit to the protective member exceeds a predefined threshold force, the projection travels along a tangential boundary of the indentations which causes the arm segment 313 to outwardly bend such that the projection is movable out of the respective indentation.

17. The medical delivery device of claim 1, wherein the dial unit is equipped with a gripping structure forming an outer surface portion of the medical delivery device.

18. The medical delivery device of claim 1, wherein the rod element and the dosage member are configured to move relative to each other along the axis such that a distance between an end of the stem of the rod element and an orifice of the dosage member is varied.

19. The medical delivery device of claim 18, wherein the rod element and the dosage member are configured such that the volume of the dosage chamber in the interior of the chamber body of the dosage member is varied concomitantly with the distance between the end of the stem of the rod element and the orifice of the dosage member.

20. The medical delivery device of claim 12, wherein the sleeve portion of the dial unit has a flexible arm segment and the second engaging structure is located at the flexible arm segment, wherein, preferably,
- in the sleeve portion an essentially U-shaped cut is provided which forms the arm segment, and/or
- a projection of the coupling structure is vertically oriented and bar-like shaped and arranged at the arm segment, and wherein the projection radially extends towards the axis of the medical delivery device.

* * * * *